United States Patent [19]

Frketic

[11] Patent Number: 5,403,024
[45] Date of Patent: Apr. 4, 1995

[54] FOLDABLE LIGHTWEIGHT PALLET CARRIER

[76] Inventor: Anton Frketic, 268 Symington Road, Winnipeg, Manitoba, Canada, R2C 2Z3

[21] Appl. No.: 157,422
[22] Filed: Nov. 26, 1993
[51] Int. Cl.⁶ ............................................. B66F 9/06
[52] U.S. Cl. .............................. 280/43.12; 280/641; 414/785
[58] Field of Search ..................... 280/43.12, 641, 651, 280/38, 43.17, DIG. 11, 47.34; 414/495, 723, 705, 785, 685

[56] References Cited

U.S. PATENT DOCUMENTS

| | | | |
|---|---|---|---|
| 2,419,422 | 4/1947 | Schulein | 280/651 |
| 3,567,054 | 3/1971 | Emke | 414/785 |
| 4,272,220 | 6/1981 | Garcia | 414/785 |
| 4,274,644 | 6/1981 | Taylor | 280/641 X |
| 4,407,521 | 10/1983 | Zeitlin | 280/651 X |
| 4,969,794 | 11/1990 | Larsen | 280/43.12 X |
| 5,117,944 | 6/1992 | Hurtevent | 280/43.12 X |

Primary Examiner—Brian L. Johnson
Assistant Examiner—Carla Mattix
Attorney, Agent, or Firm—Adrian D. Battison; Stanley G. Ade; Murray E. Thrift

[57] ABSTRACT

A hand pallet truck of the type comprising a head frame and a pair of forks projecting forwardly therefrom is modified by providing a hinge portion of the forks which can fold upwardly from the operating position to a storage position latched to the frame. The folded truck can thus be readily be transported and stored so that it can be made available for use at different locations, for example by storage within the cab of a truck. The hinged forks include a stub fork portion at the frame projecting slightly outwardly from the frame for receiving a portion of the pallet. The link bar which operates the wheels of the fork is also hinged but can only pivot in the lowered position of the forks and frame. A locking arrangement locks the hinged forks in the operating position.

11 Claims, 6 Drawing Sheets

FOLDABLE LIGHTWEIGHT PALLET CARRIER

This invention relates to a hand pallet truck for lifting and transporting a pallet.

FIELD OF THE INVENTION

Hand pallet trucks are well known of the type for lifting and transporting pallets and including a head frame and a pair of forks extending forwardly from the head frame for engaging under the pallet. Hand trucks of this type often include a manually moveable handle which is useable to effect steering of a ground wheel on the head frame, to apply a pulling force to the truck and to apply a steering action to the truck by swiveling the ground wheel on the head frame about a vertical steering axis. In addition the handle can be pumped to actuate a hydraulic pump generating hydraulic pressure in a lift cylinder which drives the ground wheel vertically downwardly relative to the head frame to lift the head frame. A linkage bar arrangement extends from the head frame to each of a pair of ground wheels on the respective fork so that simultaneously lifting movement of the head frame causes downward driving movement of the fork wheel to lift the fork under the pallet. This type of arrangement is well known and widely used for transporting pallets in a warehouse situation or in loading of transportation vehicles.

Such a pallet truck is highly mobile and can be moved from place to place but it is difficult to store or to transport in a relatively small container in view of its awkward shape including the vertical head frame, the horizontal forks and the vertical handle.

SUMMARY OF THE INVENTION

It remains therefore a significant desirability to provide a hand pallet truck of this general type which can be readily transported in a relatively small container or area by a folding action. Such an arrangement would allow a pallet truck of this type to be transported on a transportation vehicle so it is readily available for use at the unloading station.

It is one object of the present invention, therefore, to provide an improved hand pallet truck of the above general type which can be folded.

According to the invention, therefore, it is provided a hand pallet truck comprising a head frame, a pair of parallel forks mounted on the head frame such that in an operating position the forks extend horizontally forwardly from the head frame in transversely spaced relationship to engage under a pallet, first wheel means mounted on the head frame for supporting the head frame from the ground for movement across the ground, second and third wheel means each mounted on a respective one of the forks for supporting the repective fork for movement across the ground, first mounting means mounting the first wheel means on the head frame for vertical movement relative to the head frame to raise and lower the head frame relative to the ground, second and third mounting means mounting the second and third wheel means on the respective fork for vertical movement relative thereto to raise and lower the forks, said vertical movement lying between a maximum lowered position for sliding of the forks under a pallet and a maximum raised position for tranporting the pallet, the first mounting means being adapted to allow steering movement of the first wheel means about a vertical axis relative to the head, a manual actuating handle connected to the first wheel means for effecting said steering movement and for applying manual force to the truck for movement thereof across the ground, a hydraulic pump, means movable to actuate the pump to generate a hydraulic pressure, a hydraulic lift cylinder connected to said pump for effecting said vertical movement in response to said hydraulic pressure, and actuating means interconnecting the first mounting means and the second and third mounting means such that vertical movement of the first wheel means relative to the head frame causes vertical movement of the second and third wheel means relative to the respective fork, each of said forks having a hinge connection therein such that an outer portion of each fork can pivot about a horizontal axis transverse to the fork relative to the head frame from the horizontal operating position to a substantially vertical storage position.

One embodiment of the invention will now be described in the accompanying drawings in which:

BRIEF DESCRIPTION OF THE DRAWINGS

FIG. 6 is an artists Interpretation of what the lift will look like.

FIG. 7 is an enlarged view of handle design.

DETAILED DESCRIPTION

Figure 1:
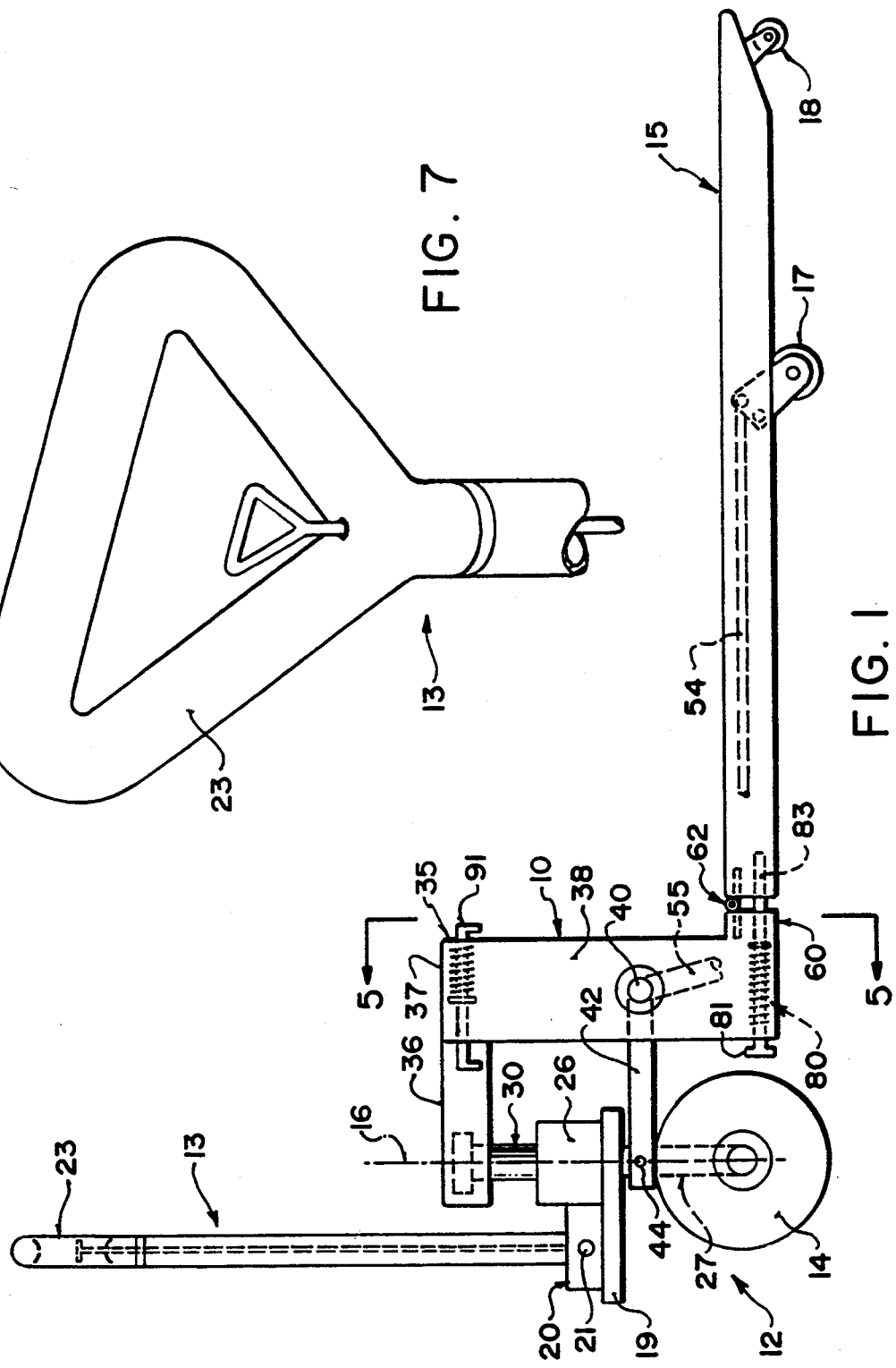
FIG. 1 is a slide elevational view of a hand pallet truck according to the present invention, showing the truck and forks in the raised, pallet lifting position

The hand pallet truck of the present invention comprises a head frame 10 on which is mounted a handle and wheel assembly 12 including a handle 13 and a pair of ground wheels 14, On the head frame 10 is mounted a pair of forks 15 which project forwardly from the head from but in an operating position of the forks. The forks are generally horizontal and spaced transversely on either side of the head frame.

Figure 2:
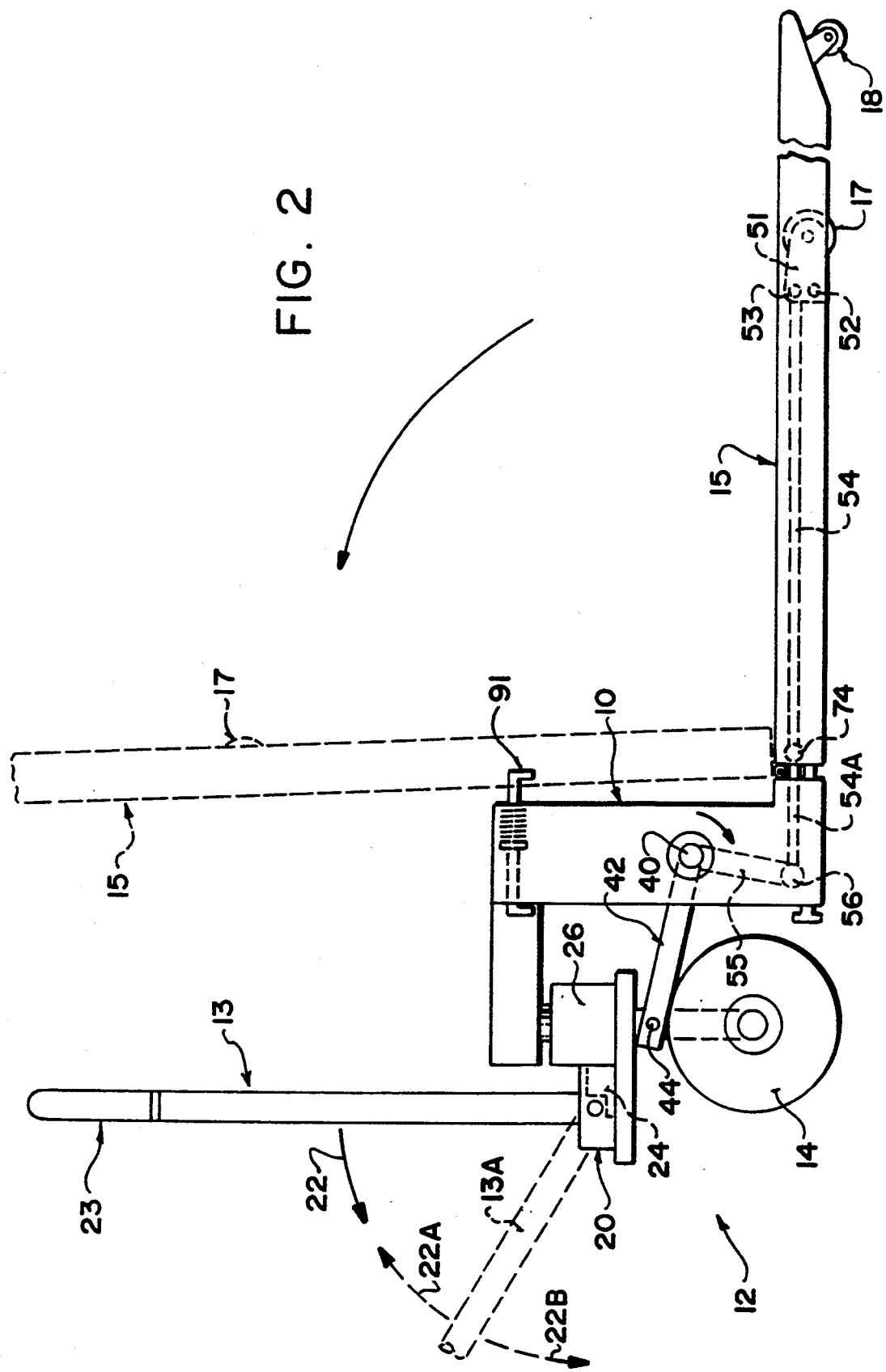
FIG. 2, is a side elevational view similar to that of FIG. 1 showing the truck and forks in the lowered position for sliding under a pallet and showing in phantom the forks in a folded position.

In general terms, the handle and wheel assembly can swivel relative to the head frame about a vertical steering axis 16 so as to move the truck by pulling of the handle by an operator to apply longitudinal force to movement of the truck and also by rotation of the handle about the axis 16 by the operator to effect steering of the truck, The handle and wheel assembly can also move vertically relative to the head frame from a retracted position shown in FIG. 2 in which the head frame is thus lowered to a position closely adjacent the ground to an extended position shown in FIG. 1 in which the head frame is raised from the ground.

Each of the forks 15 includes a respective one of a pair of ground wheels or rollers 17 arranged adjacent a forward end of the respective fork so the truck is carried in the raised position shown in FIG. 1 on the grounds wheels 14 and the rollers 17, In general terms the rollers 17 are raised and lowered simultaneously with the raising and lowering of the ground wheels 14 so that in the retracted position shown in FIG. 2 the rollers 17 are retracted to positions lying substantially wholly within the respective forks and in the extended position shown in FIG. 1 the ground roller 17 is moved to a position below the respective fork to support the fork at a position spaced from the ground. Each of the forks 15 includes a separate subsidiary ground roller 18 located at the forward end of the fork so that when the ground roller 17 is in the retracted position, the fork can be moved across the ground on the roller 18

This general arrangement and layout of the pallet truck is conventional and well known to one skilled in the art.

The wheel assembly comprises a base member 19 on which is mounted a pivot support 20 for the handle 13 allowing the handle to pivot about a transverse pivot pin 21 in the direction of arrows 22. The handle 13 includes a top manually graspable handle loop 23 which allows the operator to grasp the handle and pull it downwards in the direction of the arrow 22 to a lowered position 13A at which position a pulling force can be applied to the truck. The handle can also be pivoted to the vertical position whereat a pushing force can be applied to the handle to move the truck forwardly.

Within the support 20 is provided a hydraulic pump cylinder 24 which is operated by the handle 13 in the lowered position 13A by a pumping action of the handle in the direction of the arrows 22A and 22B. A pumping action of the handle 13 therefore generates a hydraulic pressure which is applied to a cylinder 26 to cause a lifting action of the frame 10 relative to the wheel assembly. The cylinder 26 is mounted on the base 19 with the support 20.

On the other side of the base 19 is carried a vertical shaft 27 which extends vertically downwardly therefrom to a transverse axle 28 carrying the wheels 14. The axial 28 is thus horizontal and mounted in a collar 29 attached to the lower end of the vertical shaft 27. The cylinder 26 carries a piston rod 30 which extends vertically upwardly from the upper end of the cylinder 26. The piston rod 30 is mounted in bearings 31 carried in a forward part of the frame 10. The bearings 31 are arranged around the axis 16 so as to allow rotation of the piston rod 30 relative to the axis 16. The base 19 can thus swivel about the axis 16 on the bearings 31 to cause rotation of the whole of the wheel and handle assembly about the axis 16. The piston 30 carries a piston head 32 slidable within the cylinder 26 so that the supply of hydraulic pressure from the pump 24 to the cylinder 26 pushes the piston head 32 upwardly within the cylinder to extend the piston rod from the retracted position shown in FIG. 2 to the extended position shown in FIG. 1 thus moving the wheel assembly downwardly relative to the frame 10.

The frame 10 comprises a front portion 35 and a rearwardly extending beam 36. The beam 36 is positioned at the top of the front portion 35 midway thereacross and extends therefrom to a position to receive the bearings 31 at the top of the wheel assembly.

Figure 5:
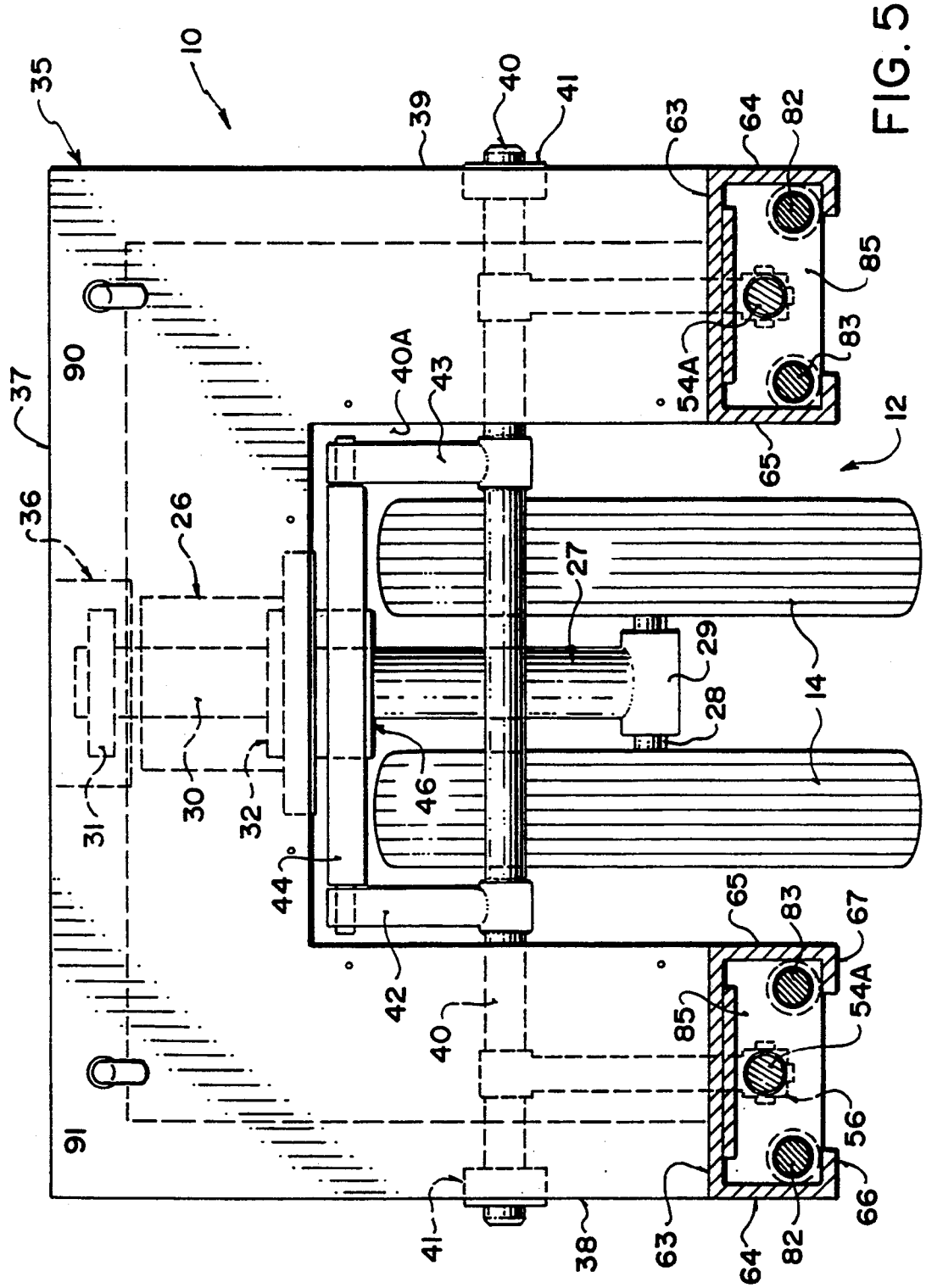
FIG. 5 is a cross sectional view along the lines 5—5 of FIG. 3 again showing the elements on an enlarged scale.
Figure 6:
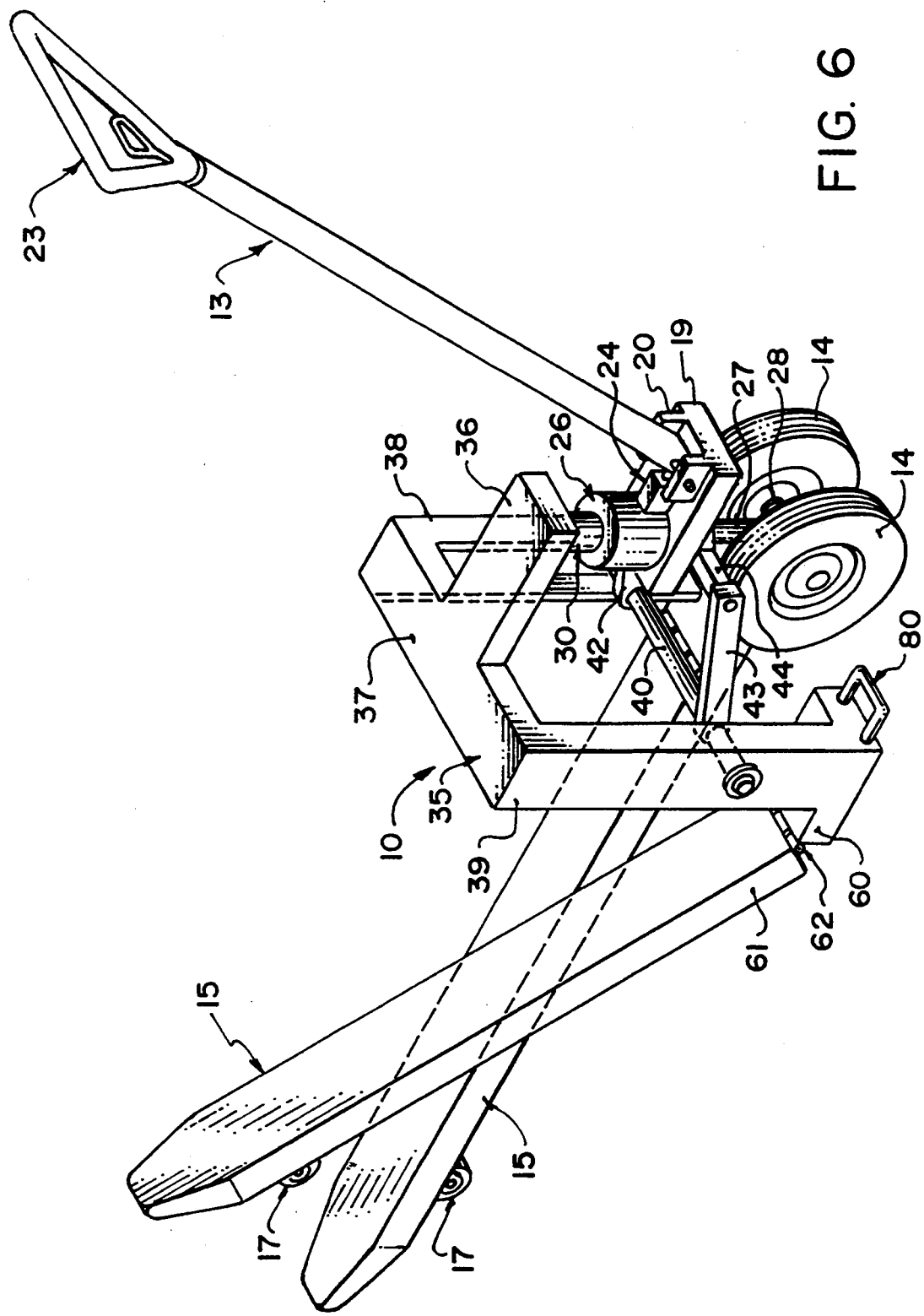

The front portion 35 is an inverted U-shape with a top cross beam 37 and a pair of depending legs 38 and 39 leaving a central open space 40A of rectangular shape as visible in FIG. 5. At the bottom of the legs 38 and 39, the forks 15 are attached as described in more detail hereinafter. The front frame portion 35 is fabricated from folded aluminum sheet of a suitable thickness to provide the required strength while defining minimum weight for the structure. The beam 36 is welded to the rear face of the cross-beam 37 at the mid point thereof.

A transverse pivot rod 40 is mounted in bearings 41 on the outside walls of the legs 38 and 39 so as to extend horizontally through the legs and across the open space 40A between the legs. The pivot rod 40 carries a pair of pivot arms 42 and 43 which extend from the pivot rod 40 rearwardly to the vertical shaft 27. A cross beam 44 interconnects the rearward end of the arms 42 and 43 and connects to the shaft 27 by bearings 46. The bearings 46 cooperate with the bearing 31 and life coaxially on the axis 16. The bearings 31 and 46 thus mount the wheel assembly for rotation about the axis 16. The arms 42 and 43 can of course however pivot upwardly and downwardly on the transverse pivot rod 40 to allow the vertical movement of the wheel assembly as will be apparent from comparisons of FIG. 1 and 2. Thus in FIG. 1 the arms 42 lie in a substantially horizontal plane rather than in FIG. 2 the arms pivot in a clockwise direction as arrow indicates which generally causes rotation of the rod 40 in the clockwise direction.

The ground rollers 17 each are mounted on a pair of side plates 50, 51 pivotally mounted on a transverse pivot pin 52 extending across the respective fork. The pivot pin 52 is arranged as close as possible to the top wall of the fork. A transfers pull pin 53 is connected across the plates 50 and 51 at a position downwardly of the pivot pin 52 and it is attached to a link rod 54 extending along the fork see FIG. 3.

Figure 3:
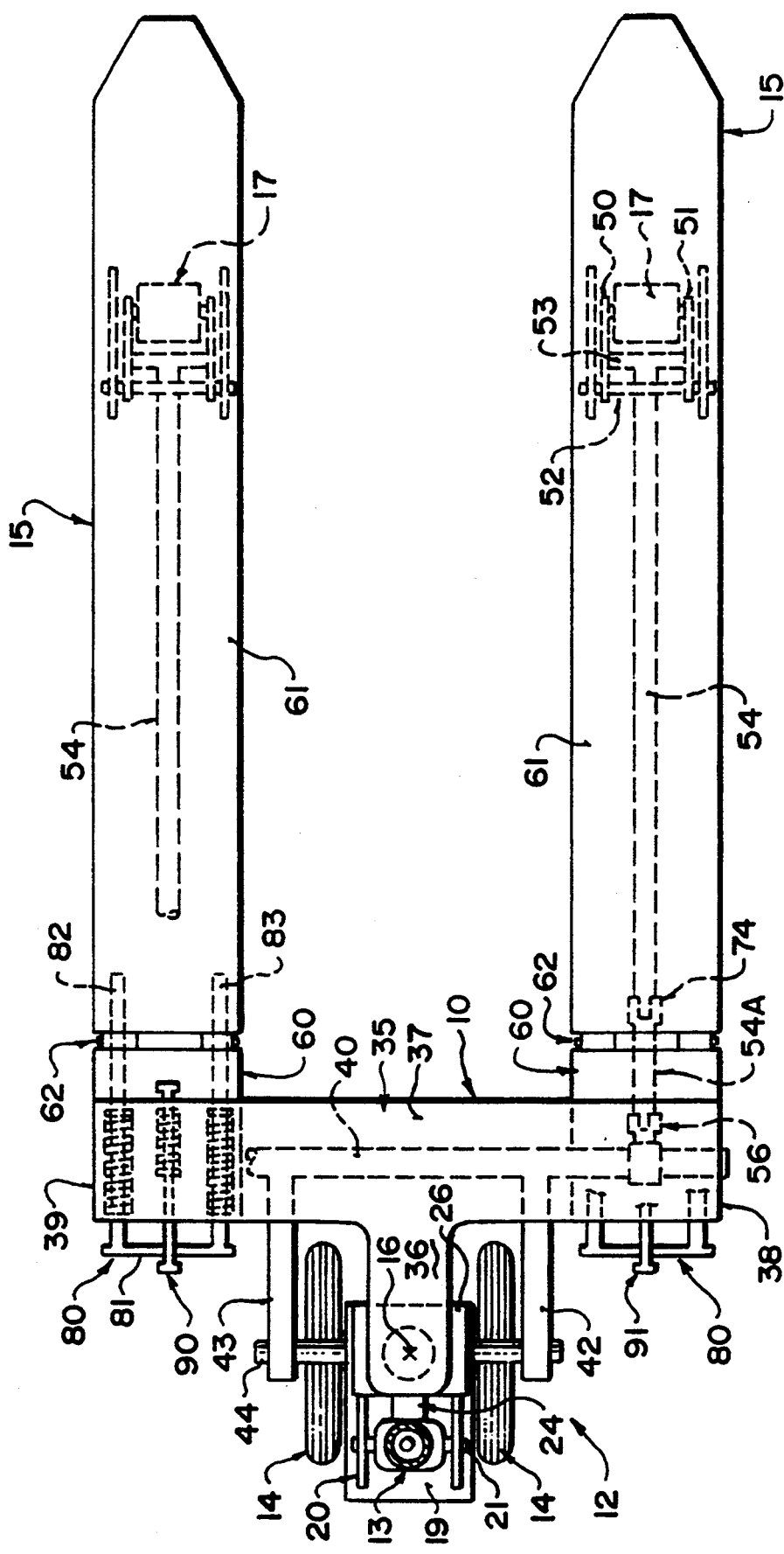
FIG. 3 is a top plan view of the pallet truck of FIG. 1.
Figure 4:
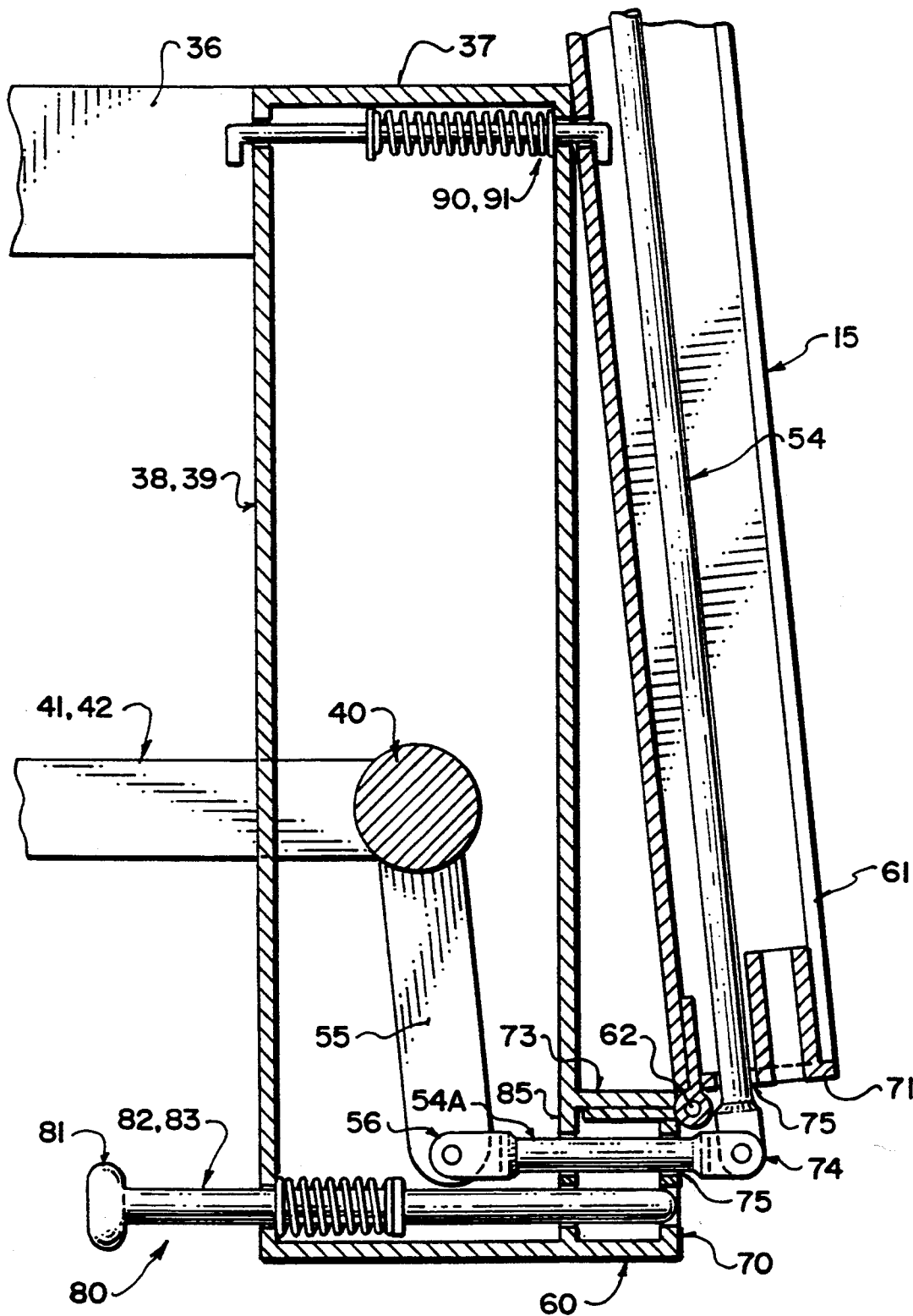
FIG. 4 is a cross sectional view taken along the lines 4—4 of FIG. 3 showing the forks ion the folded position and showing the construction on an enlarged scale.

The mechanism for actuating the link rod 54 is shown in less detail in FIG. 4 and comprises for each link rod, a verticle rod 55 connected to a pivot base rod 56 which by pivotal movement of the pivot rod 40 in the counter clockwise direction effected by downward movement of the wheel assembly causes clockwise rotation of the verticle rod 55 acting to pull the link rod 54 and to pivot the support plates 50/51 of the roller 17 in the clockwise direction moving the roller to the extended position. In symmetrical manner, movement of the rod 40 in the clockwise direction in to position shown in FIG. 2 acts to push the link 54 to retract the roller 17. The forks 15 are formed in two portions including a stub fork portion 60 and a forward fork portion 61 which are interconnected by a transverse hinge arrangement 62. The stub fork portion is welded to the bottom of the respective leg 38, 39 as best shown in FIGS. 4 and 5. The cross section of the fork is substantially constant along the length of the fork including the portion 60 and 61 and comprises a top wall 63, a pair of side walls 64 and 65 and inturned bottom flanges 66 and 67 leaving an open area 68 therebetween. The forks are formed by folding aluminum sheet into the required shape and by providing transverse stiffening elements across the forks as required to hold the forks in the required cross sectional shape to maintain the structural stability of the fork along the full length. The transverse elements include end plates 68 and 69 respectively of the fork portions. As shown in FIG. 3, the hinges 62 are arranged in a common transverse horizontal axis at right ankles to the forks. This allows each for portion 61 to move from the extended position parallel to the fork portion 60 to a raised or folded position shown in FIGS. 2 and 4 in which the fork portion 61 is substantially at right angles to the for portion 60.

The folding action is effected manually simply by lifting the fork portions 61 to rotate about the hinges 62 to the raised position. The stub fork portion 60 includes a portion 73 of the top wall 63 therefor which projects forwardly from the frame 35 and acts as a support for the under surface of a pallet to be received on the forks.

The portion of the pallet is thus carried on the stub fork portion at the frame to prevent all of the force therefrom being applied to the hinge 62. This forwardly extending portion 73 can have a length of the order of two inches which minimizes the width of the structure in the folding condition as shown in FIG. 2 but provided sufficient length to receive a portion of the pallet.

The movement of the fork portion 61 can only be effected in the lowered position of the frame and forks as shown in FIG. 2. In order to effect this pivotal movement, the link 54 also includes a hinge coupling 74 at a position therealong. In the lowered position of the frame and forks as shown in FIG. 2, the hinge coupling 74 is moved to a position (best shown in FIG. 4) which is closely adjacent the hinge 62 at a position slightly beyond the position 62.

The link 54 thus Includes a link portion 54A between the verticle rod 55 and the hinge 74 which has a length so that in the lowered position the hinge 74 takes up exactly the required position to allow the pivotal action. In the raised position, however, the hinge 74 is pulled inwardly into the stub fork portion and this prevents pivotal movement of the forks. The link 54 passes through guide opening 75 in the end plats 68 and 69 so that it is held in position and prevents pivotal movement about the hinge 62 due to the necessity to bend the link 54 to allow the pivotal action when in the raised position.

The forks are also locked in the operating position in both in the raised and lowered positions of the frame and forks by a locking bar 80 which includes a transverse grasping element 81 and a pair of legs 82 and 83 extending therefrom through a rear wall 85 of the stub fork portion, through the front wall 68 of the stub fork portion, through the rear wall 69 of the outer fork portion and into the outer fork portion to lock the outer fork portion in the aligned position with the stub fork portion. The legs 82 and 83 pass through corresponding shaped wholes in the walls and the legs are arranged at the bottom flanges 66 and 67 of the fork to be spaced from the hinge 62 by the maximum extent. Movement of the forks into the folded position can therefor only be achieved when the lock bars 80 have been pulled rearwardly from the rear wall of the stub shaft portion to an unlocked positioned removed from the forward fork portion. When the forks are moved to the operating position, the lock bar can be moved back into place and this holds the forks in the operating position even when in the lowered position of the frame and forks when the hinge 74 is properly aligned to allow the pivotal action to the storage position.

A pair of spring latches 90 and 91 are provided on the frame 35 to engage the respective fork and hold in the folded position as best shown in FIG. 2. The spring latch is preferably provided to hold legs 15 in an upright state. The latches can be released by simple manual manipulation to allow the forks to pivot back from the folded position to the operating position.

In the folded position the forks tilt slightly backwardly towards the handle 23 to provide the minimum dimensions of the device in the folded position. In this position the device can be readily stored and can be readily carried. The manufacturer of the device from aluminum sheet material provides a minimum weight for the structure allowing it to be readily carried by the operator to a storage position and returned from the storage position, erected and used for transporting pallets. Preferably the device is designed for a weight limit of the order of 1,000 or 2,000 pounds so that the total weight of the truck can be maintained at a minimum.

The right angle shape of the frame 35 including the vertical legs 38 and 39 ensures that the forks fold up against the top of the legs 38 and 39 at the cross bar 37.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hand pallet truck comprising a head frame, a pair of parallel forks mounted on the head frame such that in an operating position the forks extend horizontally forwardly from the head frame in transversely spaced relationship to engage under a pallet, first wheel means mounted on the head frame for supporting the head frame from the ground for movement across the ground, second and third wheel means each mounted on a respective one of the forks for supporting the respective fork for movement across the ground, first mounting means mounting the first wheel means on the head frame for vertical movement relative to the head frame to raise and lower the head frame relative to the ground, second and third mounting means mounting the second and third wheel means on the respective fork for vertical movement relative thereto to raise and lower the forks, said vertical movement lying between a maximum lowered position for sliding of the forks under a pallet and a maximum raised position for transporting the pallet, the first mounting means being adapted to allow steering movement of the first wheel means about a vertical axis relative to the head, a manual actuating handle connected to the first wheel means for effecting said steering movement and for applying manual force to the truck for movement thereof across the ground, a hydraulic pump, means movable to actuate the pump to generate a hydraulic pressure, a hydraulic lift cylinder connected to said pump for effecting said vertical movement in response to said hydraulic pressure, and actuating means interconnecting the first mounting means and the second and third mounting means such that vertical movement of the first wheel means relative to the head frame causes vertical movement of the second and third wheel means relative to the respective fork, each of said forks having a hinge connection therein such that an outer portion of each fork can pivot about a horizontal axis transverse to the forks relative to the head frame from the horizontal operating position to a substantially vertical storage position, wherein the actuating means comprises, for each fork, an actuating bar extending longitudinally of the fork on the underside thereof and means for moving the actuating bar longitudinally of the fork, each of the actuating bars having a hinge coupling therein allowing an outer portion of the actuating bar to pivot about a horizontal axis transverse to the forks to move from the operating position to the vertical storage position of the respective fork.

2. The truck according to claim 1 wherein the hinge connection of each fork is arranged adjacent to but spaced from the head frame so as to define an outer portion and a stub portion of each fork, the stub portion projecting forwardly from the head frame and fixed relative thereto.

3. The truck according to claim 1 including means for locking the forks in the horizontal operating position relative to the head frame.

4. The truck according to claim 2 including means for locking the outer portion of the fork relative to the respective stub portion in the horizontal operating position thereof.

5. The truck according to claim 3 where the locking means for each fork comprises a lock bar slideable longitudinally of the respective fork from a first position retracted from the outer portion to a second position inserted into the outer portion.

6. The truck according to claim 1 including means for latching the forks in the vertical storage position thereof.

7. The truck according to claim 1 wherein the head frame comprises a pair of vertical frame members each arranged at a rearward end of a respective one of the forks and extending vertically upwardly therefrom such that in the vertical storage position of the forks, each fork extends generally parallel to the frame member.

8. The truck according to claim 7 including latching means mounted on each of the frame members for engaging a respective one of the forks in the vertical storage position thereof.

9. The truck according to claim 1 wherein the hinge coupling of each actuating bar is arranged at a position thereon such that the pivotal movement of the fork to the vertical storage position is prevented except when the fork and the head frame is in the maximum lowered position thereof.

10. The truck according to claim 1 wherein the head frame and the forks are manufactured substantially wholly from aluminum.

11. The truck according to claim 1 wherein the truck has a total weight less than 100 lbs.

* * * * *